A. O. AUSTIN.
JOINT FOR ARTICLES OF CERAMIC AND SIMILAR MATERIALS AND METHOD OF PRODUCING SAME.
APPLICATION FILED NOV. 17, 1919.
1,431,137. Patented Oct. 3, 1922.
5 SHEETS—SHEET 1.
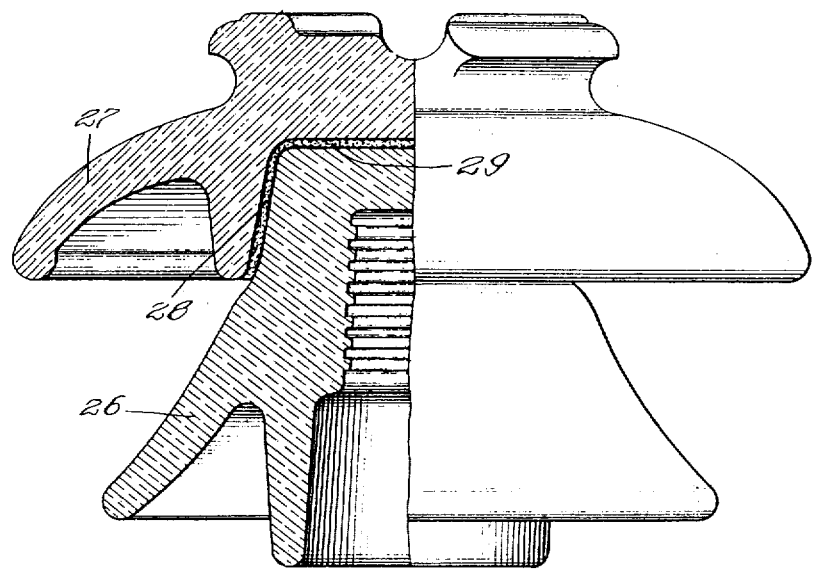
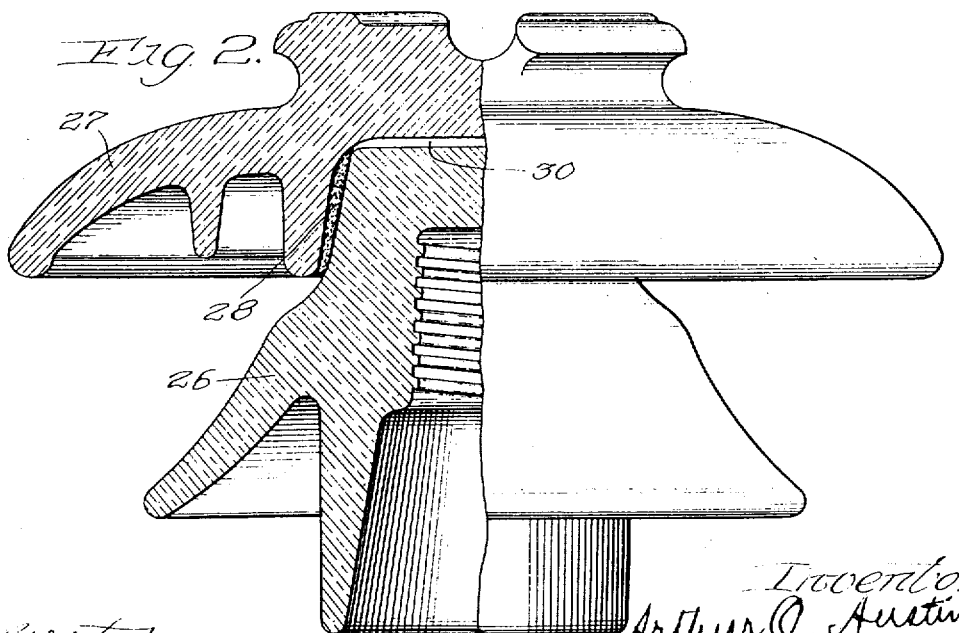

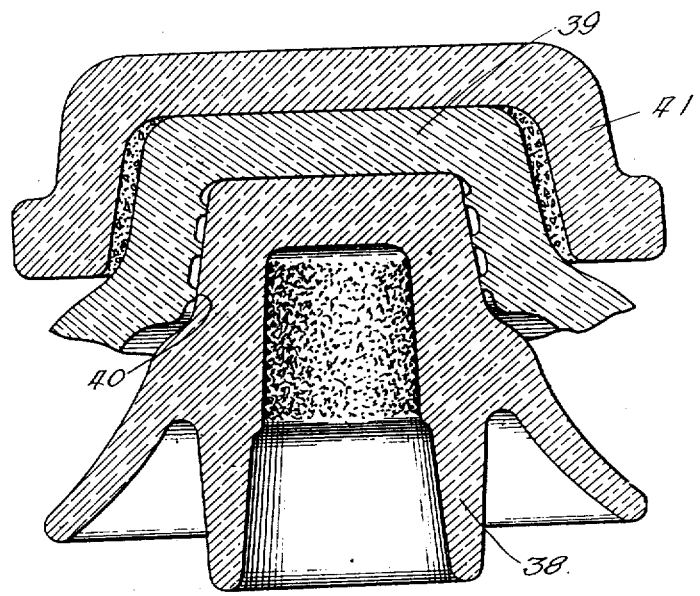
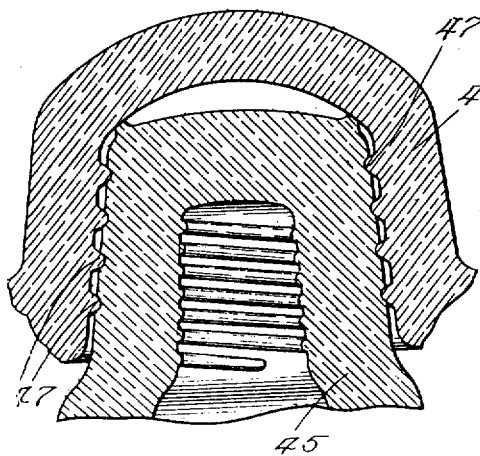
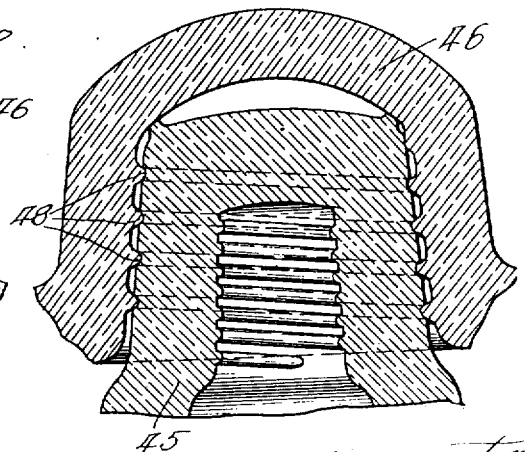

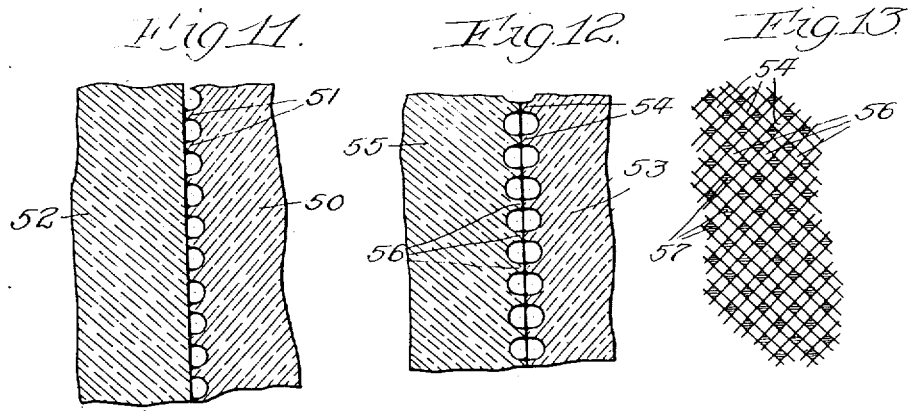
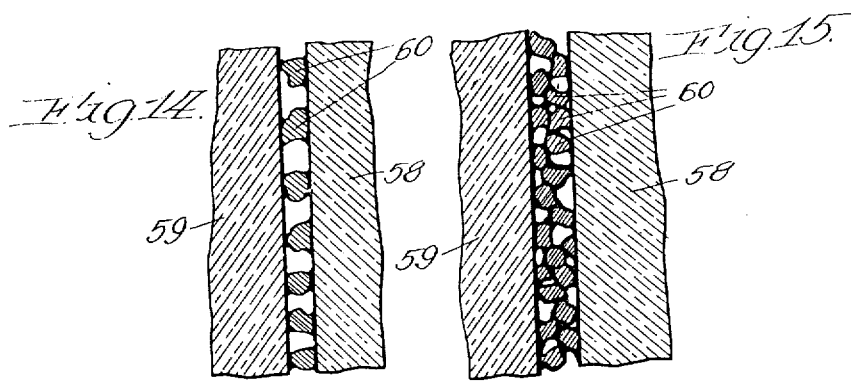
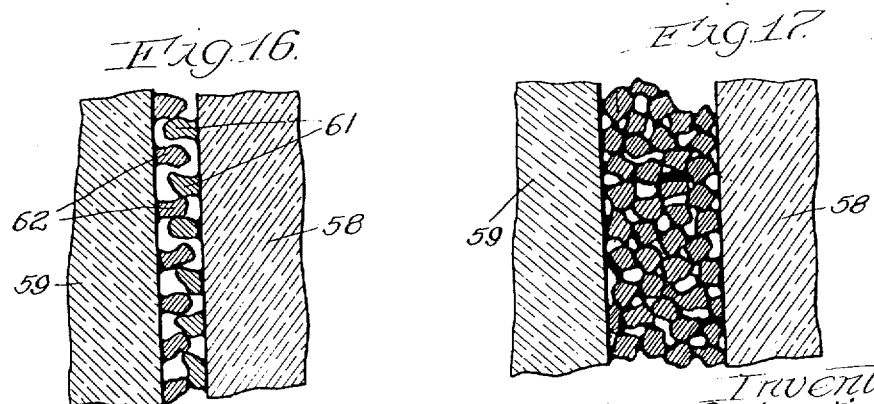

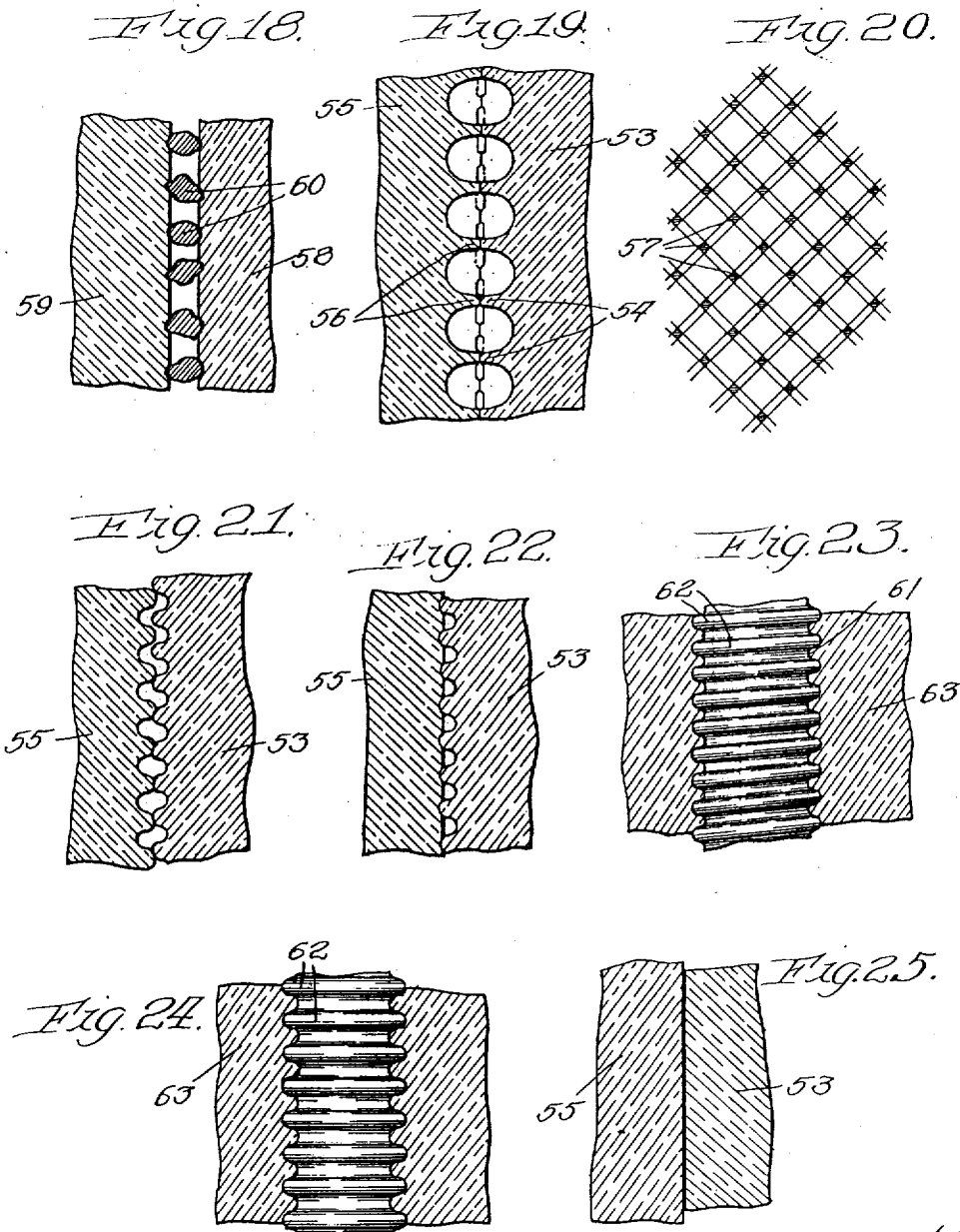

Patented Oct. 3, 1922.

1,431,137

UNITED STATES PATENT OFFICE.

ARTHUR O. AUSTIN, OF BARBERTON, OHIO, ASSIGNOR, BY MESNE ASSIGNMENTS, TO THE OHIO BRASS COMPANY, OF MANSFIELD, OHIO, A CORPORATION OF NEW JERSEY.

JOINT FOR ARTICLES OF CERAMIC AND SIMILAR MATERIALS AND METHOD OF PRODUCING SAME.

Application filed November 17, 1919. Serial No. 338,534.

*To all whom it may concern:*

Be it known that I, ARTHUR O. AUSTIN, a citizen of the United States, residing in Barberton, county of Summit, State of Ohio, have invented certain new and useful Improvements in Joints for Articles of Ceramic and Similar Materials and Methods of Producing Same, of which the following is a specification.

This invention has for its object the provision of joints or connections of the character named, which shall be of improved construction and operation and the provision of an improved method of producing such joints.

The invention is exemplified in the combination and arrangement of parts shown in the accompanying drawings and described in the following specifications and in the steps of the process illustrated in the drawings and described in the specification. The invention is more particularly pointed out in the appended claims.

In the drawings, Figure 1 is an elevation partly in section of one form of insulator having a joint embodying one form of present invention.

Figure 2 is a similar view of an insulator, showing a slightly different application of the invention.

Figure 7 is a section of an insulator illustrating the application of the process in a slightly different manner.

Figures 9 and 10 show other forms of the invention.

Figures 11, 12, 14, 15, 16, 17, 18, 19, 21, 22, 23, 24 and 25 are all fragmentary sectional views on enlarged scales showing diagrammatically various forms of joints comprised in the present invention.

Figure 13 is a diagrammatic view illustrating the arrangement of parts shown in Figure 12.

Figure 20 is a diagrammatic view illustrating arrangement of parts shown in Figure 19.

Broadly described, the invention comprises the joining of two parts composed of ceramic or similar material to one another by fusion at a plurality of limited points of contact.

The invention also contemplates the regulation of the closeness of the fit between the parts by proportioning the relative shrinkage or expansion of the parts during firing.

The invention is especially applicable to articles made of ceramic material, such as porcelain and vitreous insulators, tile, brick and other articles of like nature. In joining such articles together, it is frequently desired to provide an elastic joint to prevent injury due to unequal expansion and contraction and also to properly distribute forces transmitted from one part to another. Where articles, such as insulators for instance, have had their parts connected together by glazing material which melts in firing and fills the space between the parts, great trouble has been experienced from cracking or dunting of the parts in all but the very small insulators. This has prevented commercial success of glaze filled insulators, and other methods of joining parts have had to be resorted to.

In the present invention, a glaze joint having an open mechanical structure is produced, which affords elasticity in the joint and overcomes the difficulties previously experienced. Results sought may be secured in a large variety of ways, some of which are illustrated and described herein, but it is understood that the invention is not limited to the specific forms shown and described.

In Figure 1 there is shown an insulator having two porcelain parts 26 and 27, which are connected by a yielding fused joint 28, extending over the entire adjacent portions of the insulator parts. The amount of fused material may be thicker on the lateral faces of the insulator parts as illustrated in the figure than it is at the portion 29, or it may be distributed in other ways, depending upon the particular requirements.

In Figure 2 there is shown an insulator having similar parts 26 and 27, united by a fused joint 28, and in this particular instance an open space 30 is provided between the inner surfaces of the connected parts.

In the process of forming the joint, it is sometimes desirable to cause the connected surfaces to approach one another more closely during the firing process.

Figure 3:
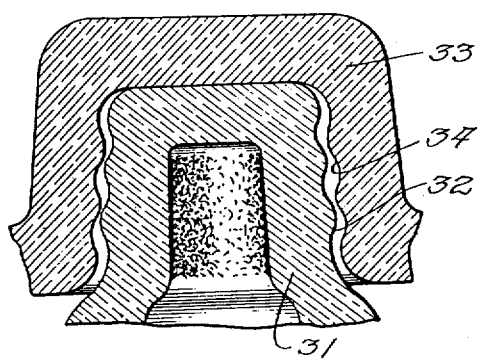
Figure 3 is a section of a portion of an insulator, illustrating one step in the process of forming the joint comprised in the present invention.
Figure 4:
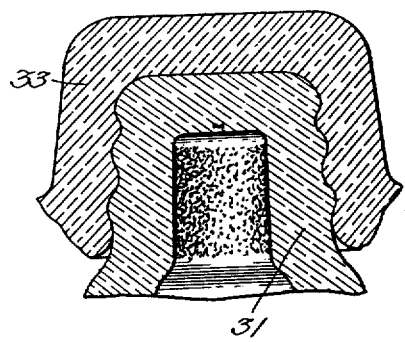
Figure 4 is a similar view showing a different step in the process.

Figures 3 and 4 illustrate two stages in the formation of such a joint. In these figures an internal part 31 is provided with a corrugated surface 32 which fits into an opening in an outer part 33 having an interior corrugated surface 34. Before the parts are fired the inner part 31 is smaller than its surrounding part 33, so that the corrugations of the two will pass one another to permit the parts to be assembled, as shown in Figure 3. The outer part is made of material which has a greater shrinkage in firing than the inner part, so that after the two parts have been fired they will be brought closer together, as illustrated in Figure 4. The difference in the amount of contraction of the two parts may be regulated by the composition of the clay of which the parts are made in a manner well known to those skilled in the art, or the inner part may be partially fired prior to assembly, so that it has already partially or totally shrunk when the two parts are placed together; this will cause a greater shrinkage of the outer part than the inner part in firing, and will produce the same result as where the outer part is made of material having a greater shrinkage than the inner part.

Figure 5:
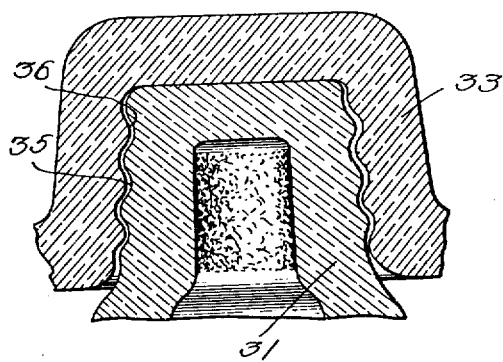
Figures 5 and 6 are similar to Figures 3 and 4, illustrating the application of the process to a different form of insulator.
Figure 6:
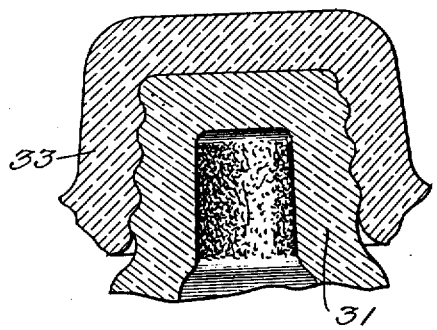

Figures 5 and 6 illustrate similar steps to those described in connection with Figs. 3 and 4, but in this case the inner part 31 instead of being provided with corrugations 32 is threaded as shown at 35, the external threads on the part 31 being arranged to mesh with internal threads 36 on the part 33. With this arrangement it is not necessary for the points of the threads to pass one another in assembling the parts, but the two parts can be threaded together by a relative rotation. The joint will be loose, however, until the parts are fired, after which they will be in close contact, as illustrated in Figure 6.

In Figure 7 an internal member 38 fits into a cap 39 which is provided with projections 40 on its inner surface. A supplemental cap 41 is placed over the external member 39, and the space between the parts 39 and 41 may be packed with a loose material, such as quartz sand to prevent the parts 39 and 41 from being fused together in firing and to transmit pressure from the part 41 to the part 39. The part 41 is made of material which has a relatively high shrinkage in firing so that it will exert pressure on the part 39 and cause the projections 41 to be pressed closely into contact with the surface of the inner member 38. Before the parts are fired, one or the other, or both of the adjacent surfaces of the members 38 and 39 is covered with a glaze, which, during the firing operation will fuse the contacting points of the projections 40 to the outer surface of the interior member 38. This will provide a joint between the members 38 and 39 which is of open mechanical structure and which will afford sufficient resiliency between the two parts to overcome dangerous stresses which might be set up by unequal contraction or expansion if solid glaze were used for connecting the parts. The fact that the outer member is pressed into engagement with the inner one during the firing by the contraction of the cap 40 insures a union of the projections 40 with the member 38 and prevents any flaring of the external member away from the inner part. This method of contraction permits the use of a very small quantity of glaze, as it is unnecessary to provide an excess of glaze material to take care of inequalities. All the glaze necessary is an exceedingly thin coat on the surface, so that any difference in the coefficient of expansion of the glaze will have little or no effect on the adjacent body portions.

Figure 8:
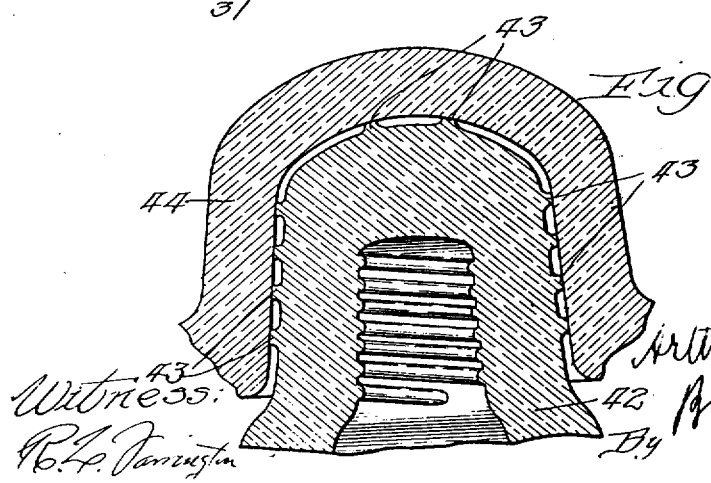
Figure 8 is a section of a portion of insulator showing a different modification of the invention.

In Figure 8 an internal member 42 is provided with projections 43, which may be formed by ribbing or knurling the surface of the internal member, or may be produced in a variety of ways. An external part 44 is fitted over the part 43 and may be made of material which will have a greater shrinkage in firing than part 42, so that the projections 43 will be pressed firmly into contact with the inner surface of the member 44 during firing. Instead of using material that will shrink differently, the parts may be caused to bear closely on one another in firing by shaping the parts so that the weight of one will tend to bring it closer to the other. This will be secured if the contacting surfaces are tapered and they will slide together during the firing operation. Sufficient glaze is provided between the two surfaces, either by glazing one or the other or both of the surfaces, so that when the parts are fired the projections 43 on the member 42 will be fused to the inner surface of the member 44 to form a resilient fused glazed joint.

Figures 9 and 10 show internal members 45 and external members 46 which are caused to come into contact during firing in a manner similar to that described in connection with Figure 8. In Figure 9 the external member 46 is provided with circular ribs 47 which are pressed into the material in the member 45 during the firing process and fused to the member in a manner similar to that described. In Figure 10 the projections 48 instead of being circular ribs as shown in Figure 9, are in the form of threads, so that the two parts may be screwed together, prior to firing, if desired. The parts may be so proportioned however, that they will go together readily before firing and the outer part will contract upon the inner part to cause the threaded projections 48 to imbed themselves slightly in the inner member in a manner similar to that described in connection with Figure 9. If the pieces are made to cause the projections on one to be imbedded sufficiently into the other to give mechanical strength no glaze is necessary. The ribs, or irregular surface has the advantage that it will imbed while the material is soft during the firing process and form an interlock. The smaller section of the ribs or irregular projections yield and are not so likely to cause damage to the outer part during the contracting period. The two surfaces may have any degree of contact by applying the glaze or fusing material in spots on the surface which only partially cover same.

The open mechanical structure of the fused joint between the two members may be produced in a variety of ways.

Figure 11 is a fragmentary section of one form of joint, in which the member 50 is provided with a knurled or ribbed surface producing projections 51 which contact with the adjacent surface of the member 52. The projections 51 of the member 50 are covered with glaze preparation, and in the firing this glaze preparation fuses the projections 51 to the member 52. It may not be necessary to glaze the surface of the member 52 as the glaze material on the projections 51 will usually be sufficient to accomplish the desired result. If additional material is found desirable, both surfaces may, of course, be glazed.

In order to provide greater elasticity in the joint, it may be advisable to knurl or rib both surfaces as shown in Figure 12, in which the member 53 is provided with ribs 54 and the member 55 is provided with ribs 56. The ribs 54 and 56 are arranged to cross one another, as illustrated diagrammatically in Figure 13, so that spaced bearing points 57 are distributed over the adjacent surfaces. These bearing points will be fused together during the firing and produce the desired open work resilient joint.

In order to insure contact of the joint, the outer piece may be of a composition that will have a greater shrinkage in firing or burning, as previously described. This shrinkage will cause the points to come into contact during the firing and while the material is soft. This arrangement is desirable to prevent the shrinkage in the glaze or the tendency of the outer part to flare from separating the two surfaces, so that the points of contact will not be properly fused together.

Figure 14 shows the parts 58 and 59 held together by interposed sand grains 60, which are fused on to the two surfaces. Practically a single layer of sand grains is used in this instance which is attached to each surface by the glaze material. The two surfaces are covered with a layer of glaze prior to assembly, and a single layer of sand grains is distributed over one of the surfaces. The parts are then assembled and during the firing process the unequal shrinkage of the two parts, or the wedging of the two parts as described, brings both surfaces into close contact with the layer of sand grains and the grains are thus fused by the glaze to both of the surfaces, so that the grains of sand in effect, form struts having opposite portions connected to the two surfaces, so that a yielding joint is thus provided.

The character of the joint may be considerably varied by changing the number and size of the sand grains used in the joint. The material for the grains 60 may be particles of the same substance which is used to form the connected parts either fired or not fired, or grains of different substances may be used.

In Figure 15 each member 58 and 59 is given a coating of sand grains 60 spread upon the liquid glaze on the surfaces of the members prior to assembly of the parts, and some, or all of the grains 60 are themselves given a coating of the glaze material, so that when the parts are fired the grains will be fused to the members 58 and 59, and will also be fused to one another to produce a resilient joint of porous or open mechanical structure.

In the form of joints shown in Figure 16, the surfaces of the members 58 and 59 are covered with the glaze material and each surface is provided with a layer of grains 61 and 62 respectively. In this case the grains themselves are not coated with the glaze material so that they are not necessarily fused together, but are fused to the respective adjacent surfaces. The projecting grains are caused to interlock with one another by the closing of the joints, due to relative unequal contraction of the connected parts.

Where greater resiliency in the joint is desired, the glazing or fusing material may be omitted from the surfaces. The greater contraction of the outer part, or the greater contraction of the parts relative to the sand grains will cause them to be imbedded in the main members while soft. This imbedding will produce an interlock and hold the parts together.

In Figure 18 a layer of grains 60 may be distributed over the surfaces of one of the members 58 or 59 which is coated with glaze and the joint between the two members may be contracted during firing by a relative unequal contraction of the bodies, so that the grains will cause indentations in the adjacent surfaces of the two bodies, and thus become partially imbedded in each of the connected bodies.

In the various forms of joints described in which sand grains are used clearance of the joint may be taken up by the use of grains of material which has previously been burned, so that it will have no further shrinkage, or if it is desired, quartz sand or grit which swells in firing may be used to secure a good fit in the joint.

In Figure 17 the surface between the members 58 and 59 is shown as being sufficiently wide to permit of the introduction of several layers of grains between the two members. This gives a joint of fairly open construction and makes it possible to provide considerable elasticity or yield in the joint. In such case it is necessary not only to fuse the grains to the body portions 58 and 59, but they must in addition be fused to one another. This can be accomplished by glazing the grains, or by mixing grains which are glazed with others that are unglazed. The structure may be made still more open and yielding by mixing with the grains other grains or particles which have a large amount of shrinkage during firing, or which will burn out, leaving open spaces. By changing the relative portions of the grains of different characters, the resiliency of the joint may be regulated to suit various conditions. Grains which are non-shrinking or even expanding during the firing process may be used, and may be unglazed if other particles are intermingled which will produce glaze material during the firing, and which will have sufficient shrinkage to produce the open work structure. The joint may, of course be made up by using any combination of grains which shrink, burn out, fuse entirely, or which may expand in firing. If the shrinking grains are made of material which will fuse and form glaze at the firing temperature, it is evident that these may serve a double purpose of keeping the structure open and providing material for fusing the other grains together.

The material for the glazing in Figure 17 may also be provided by pouring into a joint previously filled with grains, a slight amount of glaze material, either in liquid or powder form, which will run down and fuse the particles to one another and to the body. The glaze material can be made to have a large shrinkage so that it will leave an open structure of sand grains fused to one another.

Figures 19 and 20 show a structure similar to that illustrated in Figures 12 and 13, except that the parts joined in Figures 19 and 20 are caused to be pressed more firmly together by relative shrinkage, or other means, so that the ribs 54 and 56 are pressed into one another at their crossing points, causing slight depressions in the ribs where they cross one another. This insures a proper fusing of the parts where they contact. In some cases this indentation may produce sufficient interlock without the use of a glaze or fusing material.

In Figure 21 the parts 53 and 55 are roughly knurled or grooved, and are brought together so that the projections contact in a hit or miss way.

In Figure 22 the part 53 is provided with projections which are pressed into the part 55 by the relative unequal shrinkage of the connected portion, or by the weight of one part on the others.

In Figure 23 an internal member 61 is provided with threads 62 and is placed within an external member 63, so that on firing, the external member 63 shrinks upon the internal member 61 and causes the threads to become embedded in the surface of the member 63. The projection 62 may be provided in places with a glaze material so that the parts will be fused together at spaced points after firing.

Figure 24 shows a similar construction in which the ribs 62 form circular corrugations instead of threads, as in Figure 23.

In Figure 25 the parts 53 and 55 have plain abutting surfaces which are forced together by unequal shrinking and one of the surfaces has a glaze material distributed thereover at spaced points of limited extent, so that after firing, the two surfaces are fused together by the glaze material, but are thus united at separated points only. This same method of distributing the glaze or uniting the two parts may be used in connection with the joints shown in Figures 3, 4, 5 and 6.

Another form of resilient fused or glazed joint may be produced by using a composition which is viscous at the firing temperature, and which will remain full of small openings or voids after the firing is completed. The openings are produced by bubbles of gas given off during the fusing and by the air which may be entrapped in the material, so that an open structure results when the joint is completed. This open structure provides resiliency and relieves the main body portion of dangerous stress due to uneven expansion or contraction during firing or in operation.

The various forms of resilient fused joints described, in addition to eliminating the danger of injury due to unequal or improper distribution of stresses have a further advantage where a high degree of mechanical reliability is necessary. Where parts are supported by an insulator for instance, great damage may be done if the parts are permitted to fall. Insulators may be made up of multiple parts which carry the mechanical stress, and if the parts were fixedly connected together, a crack starting in one part would be very apt to continue to the other parts connected therewith. Where an open work joint is interposed between the parts such as thus described, a crack in one part will not continue across such a joint into another part, so that the mechanical reliability of the insulator is very greatly increased. This same advantage is present, not only in insulators, but in a great many structures. It is evident that multiple glass members or ceramic wares of any nature which can be fired so that glaze will fuse the grains or projections will have similar advantages where a joint of the nature described is used. It is easily seen that this is applicable to vitreous material, such as sanitary ware and building tile, or where it is desirable to limit a crack so that the pieces of ware will not be entirely destroyed, or so that a part may not become detached and fall, as in the case of building ornaments.

In the case of insulators the use of multiple shells and tube or flange members to provide mechanical reliability for pin, pillar and post type insulators, as well as insulators used in tension, is greatly facilitated by connecting the parts by means of resilient open work fused joints, in accordance with the present invention.

The invention makes it possible to make insulators of the largest size successfully. The firing operation or burning of the ware also serves the purpose of securing the several parts together, so that additional assembly work or the use of cement for joining the several parts together becomes unnecessary. The fused joint eliminates the use of conducting material in the joint, saves the labor of assembly, permits control of stress and eliminates the possibility of stress set up by cement or other holding material. This invention gives latitude in manufacture so that careful fits are not necessary.

Where it is desirable to form a conducting surface in the joint for the distribution of electrostatic stress, this can be done by pouring a plating or metalizing solution into the porous joint, such as a silvering solution, or by introducing into the joint a composition which will remain or become conducting during the burning or firing of the parts.

Where it is desirable to prevent a discharge in the spaces and it is not desirable to use a conducting material, the open space in the joint may be filled with an insulating material, such as wax, paraffine, or oil, or asphaltum.

I claim:

1. In combination a plurality of ceramic bodies having surfaces adjacent one another and spaced apart by interposed particles fused to said surfaces to connect said bodies to one another.

2. In combination a plurality of ceramic bodies having adjacent surfaces connected to one another by fused material at spaced limited points of contact.

3. In combination a plurality of ceramic bodies having adjacent surfaces connected to one another at spaced limited points of juncture by glazed material fused to said surfaces.

4. In combination a plurality of ceramic bodies joined to one another by a fused glaze having a porous structure to provide resiliency in the joint thus formed.

5. In combination a plurality of ceramic bodies connected to one another by a fused glaze and means in the joint thus formed to impart a porous resilient character to said glaze.

6. In combination a pair of bodies joined to one another by a fused glaze and particles of material interposed between said bodies in the joint thus formed to control the distribution of the glaze so as to form a porous yielding joint.

7. In combination a pair of bodies having adjacent surfaces, particles of material interposed between said bodies and having limited points of contact with said bodies and with one another, said particles being held at said points of contact by a fused glaze to form a joint between said bodies.

8. In combination a pair of ceramic bodies connected to one another by a fused glaze and particles of ceramic material held in place by said glaze in the joint thus formed to impart resiliency to said joint.

9. In combination a pair of bodies having surfaces thereof adjacent one another, separate portions of material interposed between said surfaces and connected therewith to form a yielding joint between said bodies, said portions of material being secured to one of said surfaces by fusion.

10. In combination a pair of ceramic bodies having adjacent surfaces and portions of material interposed between said surfaces and fused thereto to form a porous yielding fused joint between said bodies.

11. In combination a pair of ceramic bodies connected to one another by porous fused material to form the yielding joint between said bodies.

12. In combination a pair of ceramic bodies having adjacent surfaces, particles of material interposed between said surfaces, and having limited points of contact between said surfaces, said particles being held to said surfaces at said points of contact by fused glass.

13. In combination a pair of ceramic bodies having adjacent surfaces, spacing members interposed between said surfaces and having fused connection with one of said bodies.

14. In combination a pair of ceramic bodies having adjacent surfaces and spacing material interposed between said surfaces, said members being connected with one of said surfaces by fused glaze to provide a resilient joint of open mechanical structure.

15. In combination a pair of ceramic bodies having surfaces adjacent one another, separate spacing members interposed between said bodies and forming struts for connecting said bodies, said spacing members being secured to one of said surfaces by fused glaze.

16. In combination a pair of ceramic bodies arranged one within another, spacing members interposed between said bodies to form connecting struts between said bodies, said spacing members being held to one of said bodies by fused glazed material.

17. In combination a pair of ceramic bodies connected together by a fused joint of open mechanical structure, arranged to prevent a crack in one of said members from spreading to another thereof.

18. In combination a pair of ceramic bodies connected to one another by a joint, comprising spacing members distributed over adjacent surfaces of said bodies and held in place by a fused glazing material to provide a resilient joint of open mechanical structure, arranged to prevent the spreading of a crack in one of said members across said joint to the other member.

19. In combination a pair of ceramic bodies and grains of material being interposed between said bodies, and held in place by fused glaze.

20. In combination a pair of ceramic bodies having adjacent surfaces, spaced apart and united by a porous elastic fused joint, arranged to prevent the spread of a crack from one of said bodies to the other thereof.

21. In combination a pair of ceramic bodies having adjacent surfaces, spaced apart by grains of material distributed therebetween and held in place by fused glaze to form a porous elastic joint between said bodies, arranged to prevent the spread of a crack from one of said bodies to the other.

22. In combination a pair of ceramic bodies having a fused joint of open mechanical structure therebetween and electrical conducting material in said joint.

23. In combination a pair of ceramic bodies having spaced connecting members interposed between adjacent surfaces, and held in place by fused glaze to form a porous elastic joint between said bodies, and electrical conducting material in said joint.

24. In combination an insulator comprising a pair of connected parts and a resilient porous fused joint between said vitrified parts.

25. In combination an insulator comprising a pair of connected parts and a fused joint for holding said parts together, comprising spaced particles and fused glaze for holding said particles in place and said parts in connection with one another.

26. In combination an insulator comprising a pair of connected parts and a joint between said parts, comprising spaced connecting members secured to said parts by fused glaze and electrical material in said joint to regulate the distribution of electrical stresses.

27. The process of uniting two ceramic bodies having unequal shrinkage during firing, which comprises the assembling of the bodies prior to firing, the introduction of spacing members between adjacent surfaces of the bodies, applying glazing material to said members and firing the bodies thus assembled to cause the adjacent surfaces of said bodies to approach one another during firing and to cause said spacing members to be fused to one of said surfaces by said glazing material.

28. The process of uniting ceramic bodies to one another, comprising the steps of assembling said bodies with spacing members between adjacent surfaces thereof, applying glazing material to said spacing members and firing the bodies thus assembled to cause said bodies to be fused together by said glazing material.

29. The process of uniting ceramic bodies together, comprising the introduction of spacing particles and glazing material between adjacent surfaces of said bodies and subsequently firing the bodies.

30. The process of uniting ceramic bodies to one another, comprising the assembling of said bodies with spacing particles and glazing material between adjacent surfaces thereof and firing said bodies to cause fusion of said glazing material.

31. The process of uniting ceramic bodies together, comprising the steps of introducing a portion of one set of said bodies into an opening of another thereof, introducing spacing members and glazing material between adjacent surfaces of said bodies and firing said bodies to cause the outer one of said bodies to shrink upon the inner body and to cause said spacing members to be fused to said bodies by said glazing material.

32. In combination a pair of vitreous bodies having adjacent surfaces, means interposed between said surfaces and extending into indentations therein for holding said bodies together.

33. In combination a pair of vitreous bodies having adjacent surfaces thereof held against separation from one another and means interposed between said surfaces and extending into indentations in one of said surfaces to form a connection between said bodies.

In testimony whereof I have signed my name to this specification on this 4th day of November, A. D. 1919.

ARTHUR O. AUSTIN.